United States Patent
Jung et al.

(10) Patent No.: US 9,485,710 B2
(45) Date of Patent: Nov. 1, 2016

(54) METHOD FOR CONTROLLING ACCESS IN WIRELESS COMMUNICATION SYSTEM AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/440,047

(22) PCT Filed: Nov. 6, 2013

(86) PCT No.: PCT/KR2013/010037
§ 371 (c)(1),
(2) Date: Apr. 30, 2015

(87) PCT Pub. No.: WO2014/073866
PCT Pub. Date: May 15, 2014

(65) Prior Publication Data
US 2015/0249951 A1    Sep. 3, 2015

Related U.S. Application Data

(60) Provisional application No. 61/722,791, filed on Nov. 6, 2012.

(51) Int. Cl.
*H04W 4/00*    (2009.01)
*H04W 48/04*    (2009.01)
(Continued)

(52) U.S. Cl.
CPC ............. *H04W 48/04* (2013.01); *H04W 8/186* (2013.01); *H04W 48/02* (2013.01); *H04W 48/08* (2013.01); *H04W 60/04* (2013.01)

(58) Field of Classification Search
CPC .... H04W 8/245; H04W 60/00; H04W 80/04; H04M 1/72519
USPC ................... 455/435.1, 418, 550.1; 370/328
See application file for complete search history.

(56) References Cited

U.S. PATENT DOCUMENTS

2004/0196803 A1* 10/2004  Yi ....................... H04W 72/005
                                                                370/328
2006/0133403 A1   6/2006  Chun et al.
(Continued)

FOREIGN PATENT DOCUMENTS

KR    10-2010-0119453    11/2010

OTHER PUBLICATIONS

3rd Generation Partnership Project (3GPP), "Technical Specification Group Services and System Aspects; Service accessibility (Release 11)," 3GPP TS 22.011 V11.2.0, Dec. 2011, 27 pages.
(Continued)

*Primary Examiner* — Danh Le
(74) *Attorney, Agent, or Firm* — Lee Hong Degerman Kang & Waimey; Jonathan Kang; Jeffrey Lotspeich

(57) ABSTRACT

Provided is a method for a terminal controlling access in a wireless communication system. The method comprises: obtaining service-specific access control information; obtaining service group access control information; and controlling access to a specific type of service based on the service group access control information and the service-specific access control information. The service-specific access control information includes a service-specific barring factor parameter which is applied to the specific type of service. The service group access control information includes a service group barring factor parameter which is commonly applied to specific service groups that include at least one type of service.

14 Claims, 12 Drawing Sheets

(51) Int. Cl.
*H04W 48/08* (2009.01)
*H04W 8/18* (2009.01)
*H04W 60/04* (2009.01)
*H04W 48/02* (2009.01)

(56) References Cited

U.S. PATENT DOCUMENTS

2010/0015968 A1* 1/2010 Moriwaki ......... H04M 3/42263
455/422.1
2010/0054167 A1* 3/2010 Kawabata ............. H04L 12/189
370/312
2010/0184448 A1 7/2010 Wu
2012/0257571 A1* 10/2012 Liao ..................... H04W 4/005
370/328
2012/0323690 A1* 12/2012 Michael ................. G06Q 30/02
705/14.58
2013/0016657 A1* 1/2013 Muhanna ............... H04W 4/005
370/328
2013/0287012 A1* 10/2013 Pragada .............. H04W 76/045
370/338
2013/0297387 A1* 11/2013 Michael ............... G08G 1/0112
705/13

OTHER PUBLICATIONS

MediaTek, "EAB and Connection Establishment Cause," 3GPP TSG-RAN2 #75 Meeting, R2-114193, Aug. 2011, 5 pages.
PCT International Application No. PCT/KR2013/010037, Written Opinion of the International Searching Authority dated Feb. 7, 2014, 1 page.

* cited by examiner

METHOD FOR CONTROLLING ACCESS IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2013/010037, filed on Nov. 6, 2013, which claims the benefit of U.S. Provisional Application No. 61/722,791, filed on Nov. 6, 2012, the contents of which are all hereby incorporated by reference herein in their entirety.

BACKGROUND OF THE INVENTION

1. Field of the Invention

The present invention relates to wireless communications, and more particularly, to a method of controlling an access in a wireless communication system, and an apparatus supporting the method.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Due to mobility of a terminal as a mobile device, the quality of a service provided to a current terminal may deteriorate or a cell that may provide a better service can be sensed. Therefore, the terminal may move to a new cell and such an operation is referred to as movement execution of the terminal. The terminal may select a cell on the same frequency, a cell on a different frequency, or a different radio access technology (RAT) cell through cell selection and/or cell reselection and move to the corresponding cell.

When the UE attempts to establish a connection to access a network, whether to permit the access may be controlled, and this is called an access control. The controlling of the access of the UE may be controlled according to a service related to the access to the network.

Meanwhile, with the development of a communication system, a service provided from the network is becoming diversified. It is required to propose a method of supporting an effective access control for much more services types.

SUMMARY OF THE INVENTION

The present invention provides a method of controlling an access in a wireless communication system, and an apparatus supporting the method.

In an aspect, a method for an access control performed by a terminal in a wireless communication system is provided. The method comprises obtaining service specific access control information, obtaining service group access control information and performing an access control for a specific type of a service on the basis of the service group access control information and the service specific access control information. The service specific access control information includes a service specific barring factor parameter applied to the specific type of the service. The service group access control information includes a service group barring factor parameter applied commonly to a specific service group including at least one type of the service.

The performing of the access control may comprise, if the specific type of the service is included in the specific service group, determining whether an access to the specific service is allowed by applying the service specific barring factor parameter and the service group barring factor parameter.

The determining of whether the access is allowed may comprise calculating a survival rate by using a value of the service specific barring factor parameter and a value of the service group barring factor parameter and if a randomly drawn value within a uniformly distributed range is less than the survival rate, determining that the access to the specific service is allowed.

The performing of the access control may further comprise, if the specific type of the service is not included in the specific service group, determining whether the access to the specific service is not allowed by applying the service specific barring factor parameter without having to apply the service group barring factor parameter.

The determining of whether the access is allowed may comprise calculating a survival rate by using a value of the service specific barring factor parameter and if a randomly drawn value within a uniformly distributed range is less than the survival rate, determining that the access to the specific service is allowed.

The performing of the access control may comprise, if the specific type of the service is included in the specific service group, determining whether an access to a specific service is allowed by applying the service group barring factor parameter without having to apply the service specific barring factor parameter.

The determining of whether the access is allowed may comprise calculating a survival rate by using a value of the service group barring factor parameter and if a randomly drawn value within a uniformly distributed range is less than the survival rate, determining that the access to the specific service is allowed.

The performing of the access control may comprise, if the specific type of service is included in the specific service group, determining whether the access to the specific service is allowed by applying the service specific barring factor parameter without having to apply the service group barring factor parameter.

The determining of whether the access is allowed may comprise calculating a survival rate by using a value of the service specific barring factor parameter and if a randomly drawn value within a uniformly distributed range is less than the survival rate, determining that the access to the specific service is allowed.

The method may further comprise receiving service grouping information, wherein the service grouping information indicates a relation between the specific service and the specific service group.

Access class barring information based on an access class allowed to the terminal may be additionally applied to an access control for the specific service.

In another aspect, a wireless apparatus operating in a wireless communication system is provided. The apparatus comprise a radio frequency (RF) unit for transmitting and receiving a radio signal and a processor operatively coupled to the RF unit. The processor is configured for obtaining service specific access control information, obtaining service group access control information and performing an access control for a specific type of a service on the basis of the service group access control information and the service specific access control information. The service specific access control information includes a service specific barring factor parameter applied to the specific type of the service. The service group access control information includes a service group barring factor parameter applied commonly to a specific service group including at least one type of the service.

In still another aspect, a method of controlling an access performed by a terminal in a wireless communication system is provided. The method comprises obtaining service-specific access control information applied to a specific service and performing an access control for a requested service. The performing of the access control for the requested specific service comprises if the requested service corresponds to the specific service, performing an access control for the requested service on the basis of the service specific access control information and if the requested service does not correspond to the specific service, performing an access control for the requested service on the basis of default service group access control information applied to a service group other than the specific service.

The default service group access control information is pre-set in the terminal.

According to an embodiment of the present invention, there is provided an access control method based on service grouping and serving group access control information in a communication environment capable of providing significantly various services. Since signaling for providing a barring parameter through the service grouping can be minimized, an effective access control is performed. In addition, even if a network does not provide access control information that can be dedicatedly used for a corresponding service among services used by a user equipment through a default service group, an access control for the corresponding service may be possible.

DESCRIPTION OF EXEMPLARY EMBODIMENTS

Figure 1:
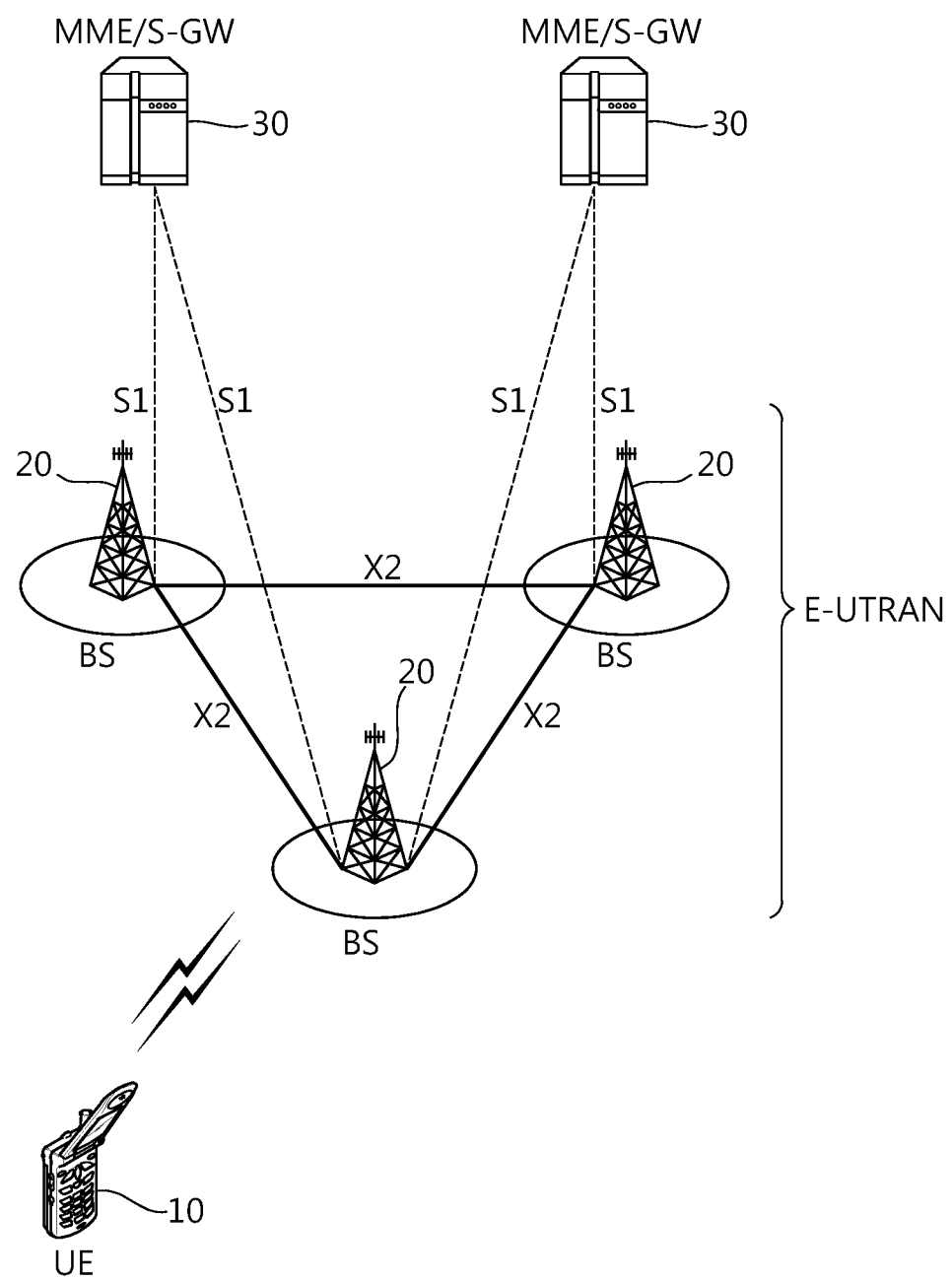
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
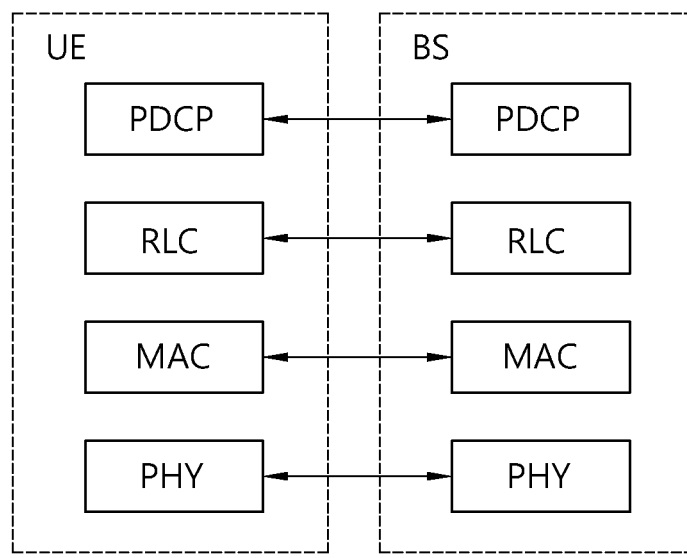
FIG. 2 is a block diagram illustrating a radio protocol architecture for a user plane.
Figure 3:
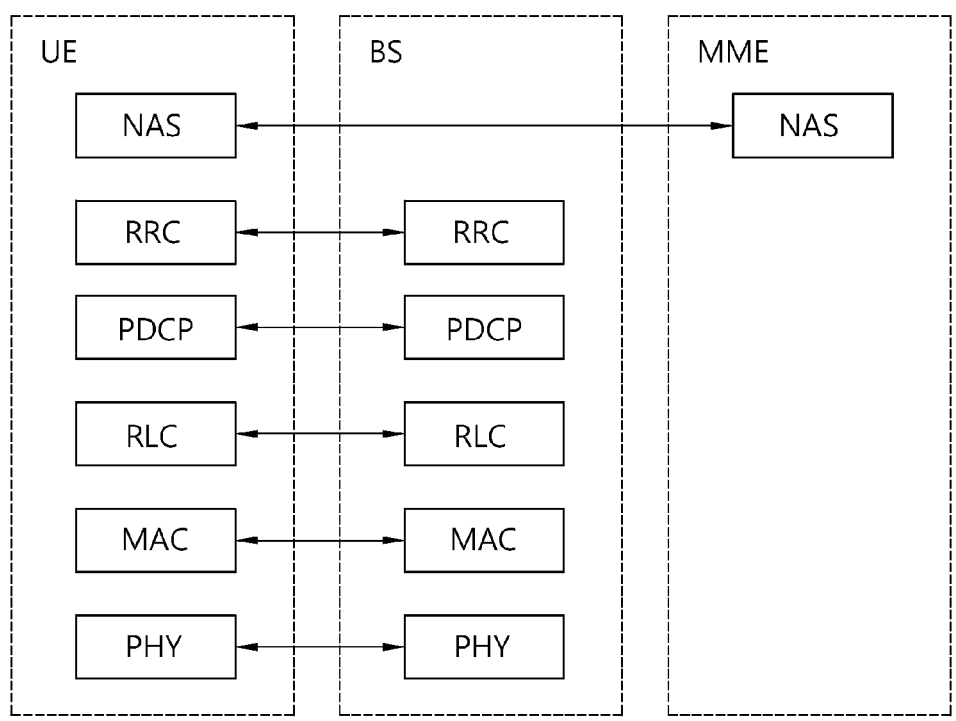
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all terminals. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The terminal may apply acquisition and change sensing procedures of the system information only to a PCell. In an SCell, the E-UTRAN may provide all system information associated with an RRC connection status operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The terminal needs to guarantee validity of specific type system information and the system information is referred to as required system information. The required system information may be defined as follows.

In the case where the terminal is in an RRC idle status: It needs to be guaranteed that the terminal has valid versions of the MIB and the SIB1 as well as the SIB2 to SIB8 and this may be followed by supporting a considered RAT.

In the case where the terminal is in an RRC connection status: It needs to be guaranteed that the terminal has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
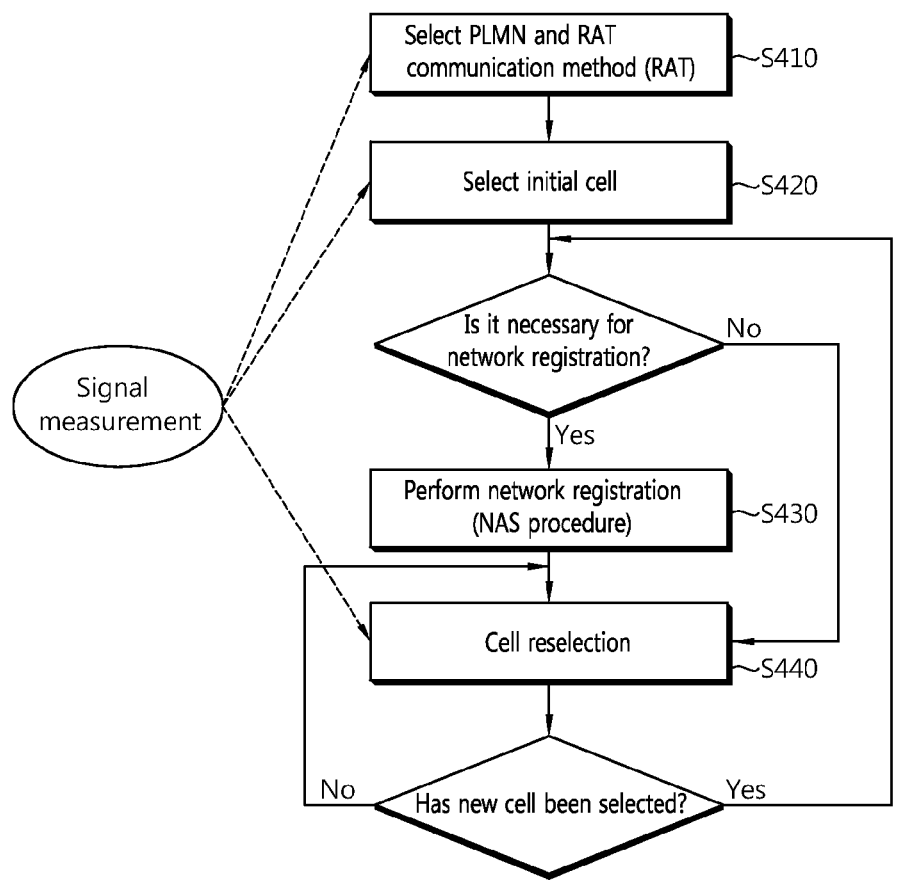
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
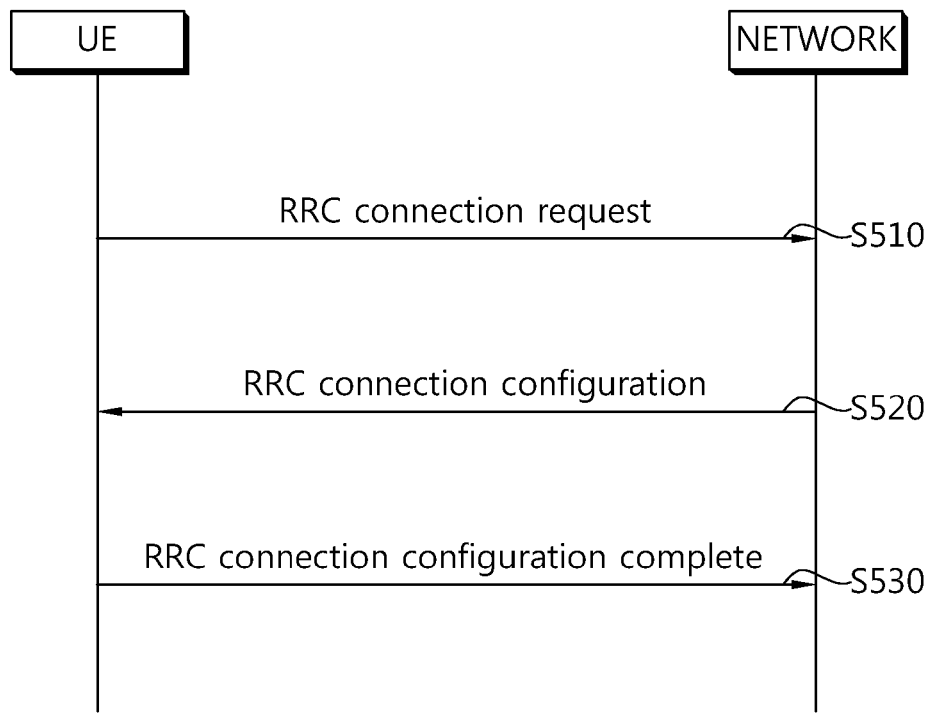
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
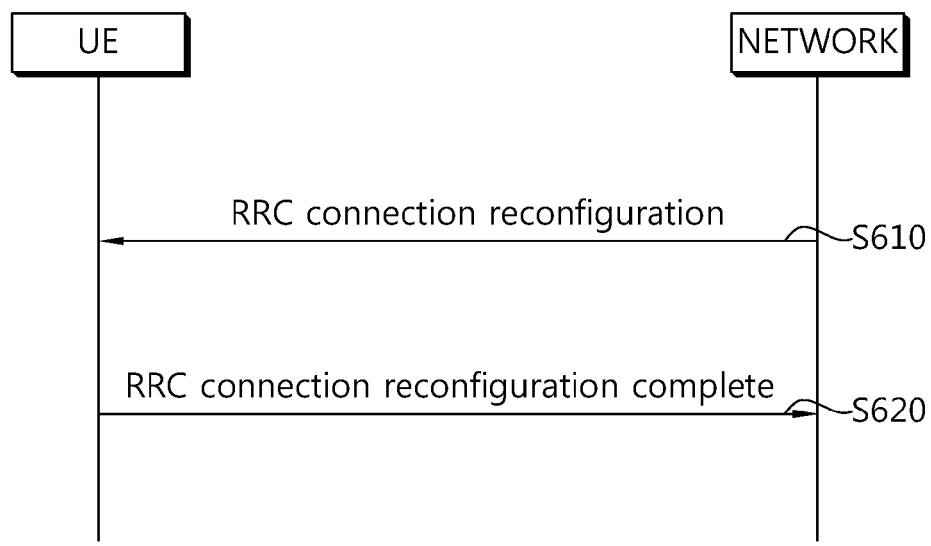
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009 March) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, R_n = Q_{meas,n} - Q_{offset} \quad \text{[Equation 1]}$$

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion $R_s$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_s$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
- a case where the UE determines that there is a serious problem in the downlink communication link quality based on the radio quality measuring result of the PHY layer (determines that the quality of the PCell is low during the RLM.
- a case where the UE determines that there is a problem in the uplink transmission when a random access procedure is continuously failed in a MAC sub-layer.
- a case where the UE determines that there is a problem in the uplink transmission when uplink data transmission is continuously failed in an RLC sub-layer.
- a case where the UE determines that the handover is failed.
- a case where a massage received by the UE does not pass through an integrity check.

Hereinafter, the RRC connection re-establishment procedure will be described in more detail.

Figure 7:
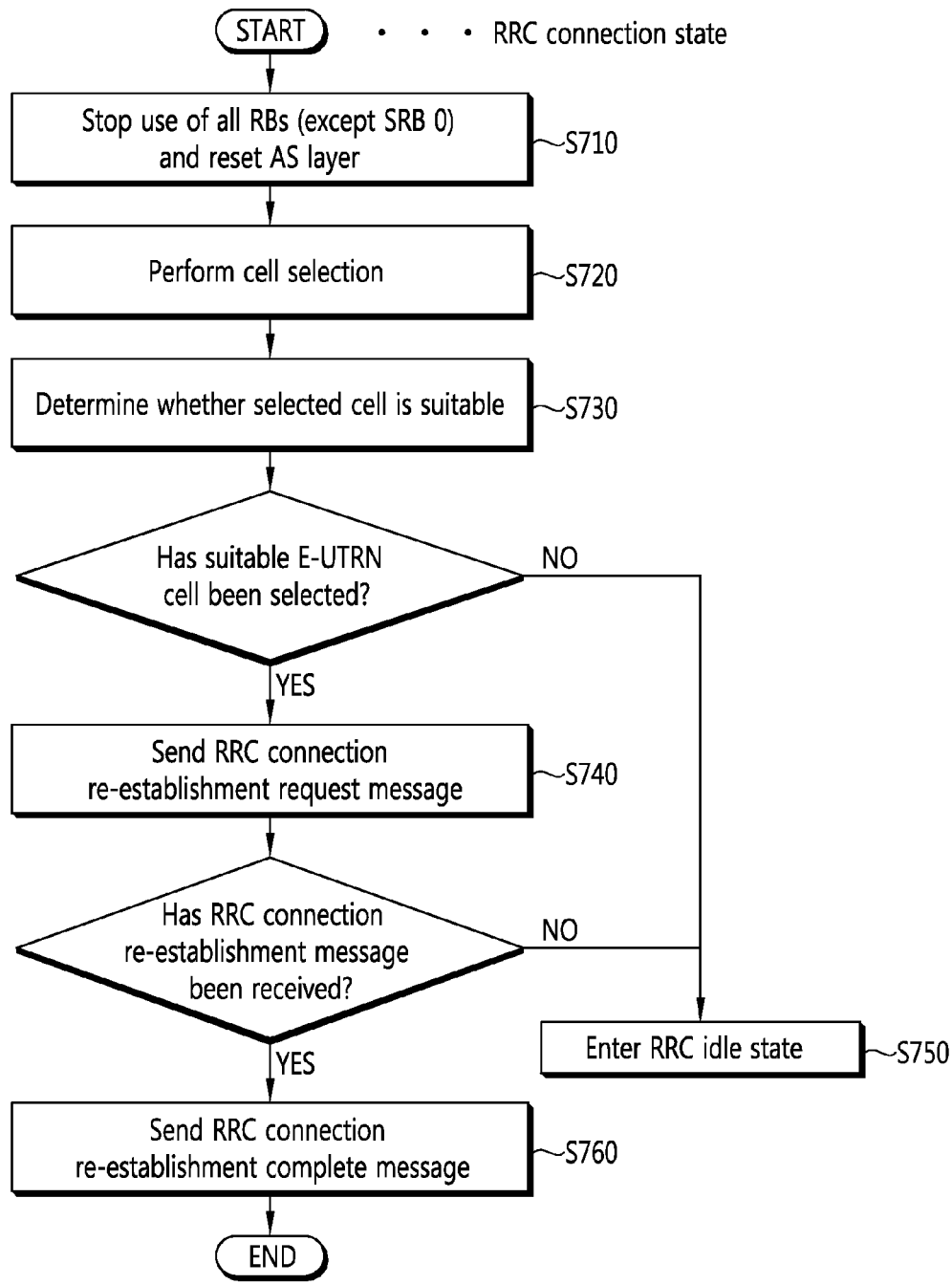
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, UE and network operations related to an RRC connection rejection will be described. In the RRC connection establishment procedure, when the network transmits an RRC connection reject message to the UE in response to an RRC connection request message of the UE, the network may not allow an access of the UE as to a corresponding cell and/or an RAT of the corresponding cell according to a current network situation. For this, in order for the network to prohibit a network access of the UE, the RRC connection reject message may include information related to a cell reselection priority and/or access restriction information for restricting a cell access.

The network may allow the RRC connection reject message to include lowest priority request information indicating that a lowest priority is applied when the UE performs cell reselection. The lowest priority request information may include lowest priority type information indicating a type for applying the lowest priority and lowest priority timer information which is a duration time of applying the lowest priority. It may be configured such that the lowest priority type information indicates that the lowest priority is applied to a frequency of a cell which transmits the RRC connection reject message or indicates that the lowest priority is applied to all frequencies of RAT of a corresponding cell.

Upon receiving the RRC connection reject message including the lowest priority type information, the UE may start a timer which is set to the duration time of applying the lowest priority, and may perform a cell reselection by applying the lowest priority with respect to a target indicated by the lowest priority type information.

Meanwhile, when the lowest priority information is provided through the RRC connection reject message, a collision may occur with a reselection priority signaled by the network. In this case, the UE may be implemented to operate by applying the lowest priority preferentially to a specific frequency according to the lowest priority information provided through the RRC connection reject message. In addition, the lowest priority information based on the RRC connection reject message may collide when applying an implicit priority based on a UE-originated indication such as a multimedia broadcast multicast service (MBMS) interested indication, a proxy indication related to a closed subscriber group (CSG), and an IDC indication related to an IDC interference. Accordingly, a priority to be applied preferentially may conform to a UE or network implementation.

In order to restrict a network access of the UE, the network may insert wait time information into the RRC connection reject message. Upon receiving the RRC connection reject message including the wait time information, the UE may set a wait timer by an indicated duration time and may start the wait timer. During the wait timer is running, the UE may not perform an RRC connection establishment procedure for a network access.

For a delay tolerant UE which is a more adaptive UE with respect to a delayed service, the network may insert extended wait time information into the RRC connection reject message. The extended wait time information may be implemented to indicate an extended wait duration time value longer than the aforementioned wait time duration information value. The UE performs a network access on the basis of the extended wait time information if the extended wait time information is included in the RRC connection reject message and the UE is the delay tolerant UE. On the other hand, if the UE is not the delay tolerant UE, the UE may perform the network access on the basis of the wait time information.

Hereinafter, access restriction and control will be described.

In a current wireless communication system, two mechanisms that a provider to perform cell reservation or access restriction are provided. A first mechanism is a technique using indication of a cell status and special reservation for controlling cell selection and reselection procedures. A second mechanism as a technique referred to as access control is a technique that prevents a user of a selected class to transmit an initial access message due to a load control. In the following description, it is assumed that one or more access classes are allocated to the terminal and are stored a universal subscriber identity module (USIM).

Hereinafter, an access restriction mechanism associated with information regarding the cell status and the cell reservation will be described.

The information regarding the cell status and the cell reservation is included in system information block type 1 (SIB1).

The information regarding the cell status is configured to indicate whether to barring accessing the cell. That is, the cell status information may indicate that the accessing of the cell is barred or not barred. When a plurality of PLMNs is indicated in the SIB1, the cell status information may be commonly applied to all PLMNs.

The information regarding the cell reservation is configured to indicate whether the cell is a cell reserved for use by a specific provider. That is, the cell reservation information may be configured to indicate that the cell is reserved or not reserved. When the plurality of PLMNs is indicated in the SIB1, the cell reservation information may be specified for each PLMN.

When the cell status information indicates 'not barred' and the cell reservation information indicates 'not reserved', all terminals may consider a corresponding cell as a candidate cell during the cell selection and cell reselection procedures.

When the cell status information indicates 'not barred' and the cell reservation information indicates 'reserved', in the case where terminals that operate in the HPLMN/EHPLMN and correspond to access classes 11 to 15 are reserved with respect to the corresponding PLMN, the terminals may consider the corresponding cell as the candidate cell during the cell selection and cell reselection procedures. On the contrary, in the case where terminals that correspond to access classes 0 to 8 and 12 to 14 are reserved with respect to an rPLMN or selected PLMN, the terminals regard that the status of the corresponding cell is the 'barred' status and perform the operation.

When the cell status information indicates 'barred' or it is regarded that the corresponding cell is in the 'barred' status, the terminal may not select/reselect the corresponding cell and this is similarly applied even to an emergency call. The terminal may operate as follows in selecting other cell.

When the corresponding cell is a CSG cell, the terminal may select other cell at the same frequency when the cell selection/reselection condition is satisfied.

When the corresponding cell is not the CSG cell, the terminal may perform the cell selection/reselection procedure according to the intra-frequency cell reselection information. The intra-frequency cell reselection information may indicate whether the terminal may perform intra-frequency cell reselection when accessing a best ranked cell at a current frequency is barred. When the intra-frequency cell reselection information indicates that the intra-frequency cell reselection is allowed, the terminal may select other cell at the same frequency when the cell reselection condition is satisfied. Meanwhile, the terminal excludes the barred cell from the candidate cell for a specific time (e.g., 300 seconds) during the cell selection/reselection procedure. When the intra-frequency cell reselection information indicates that the intra-frequency cell reselection is not allowed, the terminal may regard that the cell at the same frequency is barred and perform an operation of selecting a cell at an inter-frequency. The terminal excludes the barred cell and the cell at the same frequency from the candidate cell for a specific time (e.g., 300 seconds) during the cell selection/reselection procedure.

Hereinafter, an access control technique based on the access class will be described.

Information on the cell access restriction associated with the access class is included in the system information to be broadcasted. The terminal disregards the access class associated with the cell access restriction in selecting a cell on which the terminals is to camp. That is, since any access class of the terminal is not allowed to access the corresponding terminal, the terminal does not exclude the corresponding cell even with respect to the camp-on A change of the indicated access restriction does not trigger the cell reselection by the terminal. The access class associated with the cell access restriction may be checked by the terminal in starting an RRC connection establishment procedure.

The restriction of the emergency call may be indicated by emergency call access class information as necessary. The emergency call access class information may be implemented as an ac-BarringForEmergency parameter of system information block 2 (SIB2) included in the system information. When it is indicated that access class 10 is barred in the cell, terminals that correspond to classes 0 to 9 or a terminal without an international mobile subscriber identity (IMSI) is not allowed to start the emergency call in the corresponding cell. When it is indicated that access class 10 and associated access classes 11 to 15 are barred, terminals that correspond to access classes 11 to 15 are not allowed to start the emergency call in the corresponding cell. Otherwise, the corresponding terminal may be allowed to start the emergency call.

A terminal in which extended access barring EAB is available performs EAB checking to check whether accessing the current cell is barred in performing the RRC connection establishment. When accessing the cell is barred according to the result of the EAB checking, the EAB is applied to the NAS which is the higher layer and it is notified that the RRC connection establishment is unsuccessful.

In the case of performing the RRC connection establishment for calling mobile termination (MT), the terminal notifies to the NAS as the higher layer that the RRC connection establishment is unsuccessful and access restriction to the MT calling is applied when a T302 timer as a timer depending on rejection of the RRC connection is driven.

In the case of performing the RRC connection establishment for calling mobile originating (MO), the terminal may check whether accessing the current cell is barred based on an access class parameter provided based on the allocated access class and the system information. When the terminal determines that the access to the current cell is barred, the terminal may check whether the access to the current cell is barred by additionally considering a circuit switched fallback (CSFB) associated the access class parameter and notify the checked information to the NAS layer as the higher layer.

Hereinafter, a multimedia telephony service (MMTel) will be described.

The MMTel may provide converged, fixed mobile real-time multimedia communication as a global standard based on an IP multimedia subsystem (IMS), so that media capabilities such as voice, real-time video, text, file transmission, etc., can be used and photos, audio and video clips, etc., can be shared. In the MMTel, a user may add or delete media during a session. That is, during the session, chatting, voice adding, another caller adding, video adding, media sharing, file transfer, and specific capabilities thereof may be deleted.

Deterioration in service quality may occur in an emergency situation such as earthquake or tsunami. Although deterioration in a service availability and performance may be tolerated in the emergency situation, there may be a need for a mechanism of minimizing such deterioration and increasing efficiency of the remaining radio resources.

An original purpose of introducing a domain specific access control (DSAC) in UMTS is to allow a packet switched (PS) service to be continued during a congestion occurs on a circuit switched (CS) mode because of the emergency situation or the like. In an actual UMTS development situation, an example of using DSAC is for applying an access control individually to different types of services such as voice and other PS services, etc. For example, a voice call is created in general in the emergency situation in a human emotional aspect, which is not changed if possible. Therefore, there may be a need for a mechanism for individually restricting voice call and other services.

An evolved packet system (EPS) is a PS domain system, and DSAC is not applied. Instead, a service specific access control (SSAC) is applied. When considering a characteristic of voice and non-voice calls in EPS, requirements of SSAC may be configured to be restricted individually as to the voice call and the non-voice call.

There is quality of service (QoS) requirements for a typical charged service. A service provider may shut down a corresponding service when the aforementioned requirements are not satisfied. Most importantly, a communication channel must be maintained without interruption in the emergency situation, and it may be more preferable to provide a best effort service instead of shutting down the service by the service provider. There is a possibility that the service provider allows the service during the emergency situation, and an extended credit may be given to a subscriber not having an access right. An overload access control which provides an access only to a concerned person or a predetermined user group may be applied in a specific environment. When considering a characteristic of voice and non-voice calls in EPS, an overload access requirement for SSAC may be configured to be restricted individually for the voice call and the non-voice call.

SSAC is used to control an access attempt for MMTel-voice and MMTel-video. A cell may broadcast access control information for the MMTel-voice and the MMTel-video through system information transmitted on a BCCH. Upon receiving the system information, the UE may acquire access control information for the MMTel-voice and the MMTel-voice. The access control information may include a barring factor parameter and a barring time parameter. Different barring factor parameter and barring time parameter sets may be provided to the MMTel-voice and the MMTel-video.

Upon receiving SSAC information, an RRC layer of the UE may simply forward the received SSAC information to an MMTel layer of the UE. In this case, when the UE intends to establish an RRC connection for an MMTel application, the MMTel layer of the UE may determine whether the RRC connection establishment can start on the basis of the SSAC information.

However, according to the aforementioned SSAC mechanism, the SSAC is not applied to other applications except for voice and video services. Therefore, even if an operator desires to preferably have an access to the voice call, since SSAC information for other applications except for the voice and video applications is not defined, it may be difficult for the operator to bar an access for the non-voice call.

In a communication environment in which significantly various types of services can start, it may be inappropriate to define barring information on an individual type of the service in terms of signaling efficiency. Therefore, in order to effectively perform a service control through a small amount of signaling if possible, there may be a need to define access control information commonly applicable to the various types of services and a method for applying this.

In addition, similarly to a case where a network does not provide access control information dedicatedly applicable to a corresponding service among services used by the UE, if the UE does not have the access control information to be applied to the corresponding service, there may be a need for a method capable of performing an access control related to the corresponding service.

By considering the aforementioned aspect, the present invention may group at least one service into one service group, and may define access control information commonly applicable to a corresponding service group.

At least one service may be grouped into one service group. For example, one or more MMTel services such as a voice service and a video service may be grouped into one service group. For another example, MMTel services other than the voice service and the video service may be grouped into one service group. For another example, the MMTel services other than the voice service may be grouped into one service group.

There is a need to provide information on grouping of services to the UE. The information on the grouping indicates a correlation between at least one service and a specific service group. The UE may confirm whether a specific service is subjected to service grouping on the basis of the information on the grouping, and if it is grouped, to which service group it is grouped.

Related service group access control information may be defined in a service group based on the service grouping. Service group access control information may include a service group barring factor parameter and a service group barring time parameter. The parameters may be commonly applied for an access control of at least one service in a related service group.

The aforementioned service grouping information and service group access control information may be transmitted from a cell in a broadcast manner. In this case, the service grouping information and the service group access control information may be transmitted by being included in system information. Alternatively, the service grouping information and the service group access control information may be transmitted to the UE through signaling dedicated to the UE. Upon receiving the control information transmitted through the dedicated signaling, the UE in an RRC-connected state may not delete but maintain the control information even in case of entering an RRC-idle state. The UE may apply the control information when performing an access control. Alternatively, the service grouping information and the service group access control information may be pre-set in the UE, and this may be recognized by the UE.

Meanwhile, a default service group may be defined as a service group. The default service group may be defined as a group of the remaining services which are not grouped by the network. For example, if only a voice service and a video service are grouped into one service group by the network, other services may be grouped into the default service group.

As another definition of the default service group, the default service group may be defined as a group of services to which SSAC information to be applied is not provided among the remaining services not grouped by the network.

As another definition of the default service group, the default service group may be defined as a group of the remaining services other than one or more services grouped by the UE by using predetermined information without being grouped by the network. For example, if only the voice service and the video service are grouped into one service group, other services may be grouped into the default service group.

As another definition of the default service group, the default service group may be defined as a group of services not providing service specific access control information by the network. For example, if access control information is provided only for the voice service and the video service, other services except for the voice and video services may be grouped into the default service group.

If the default service group is defined, access control information applied to the default service group may be defined together. Default service group access control information may include a service group barring factor parameter and a service group barring time parameter. The parameters may be commonly applied for an access control of at least one service in a related service group. The default service group access control information may be provided to the UE through broadcasting or dedicated signaling, or may be pre-set in the UE.

An access control method which can be performed when services are grouped and group access control information is provided to a UE as described above is described in detail.

Figure 8:
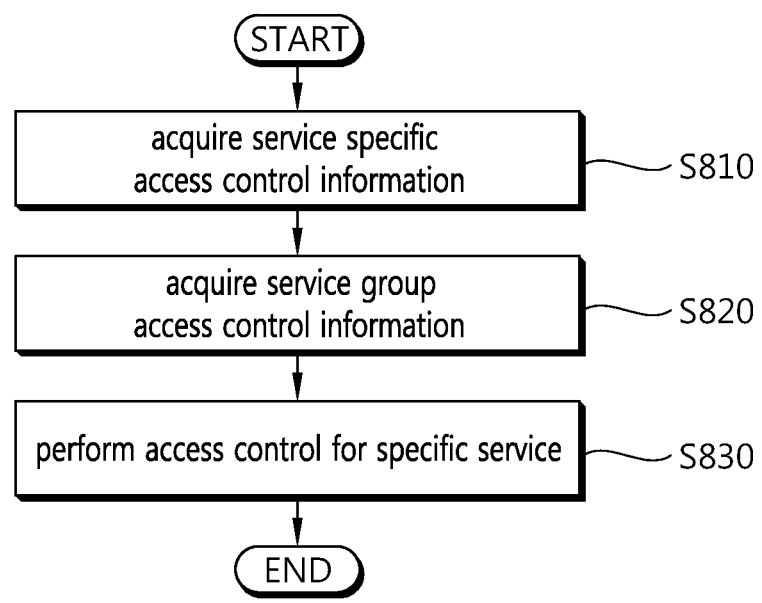
FIG. 8 shows an access control method according to an embodiment of the present invention.

FIG. 8 shows an access control method according to an embodiment of the present invention.

Referring to FIG. 8, a UE acquires SSAC information (step S810). By acquiring the SSAC information on at least one service, the UE may acquire a barring factor parameter and a barring time parameter which can be applied in an access control for each service.

The UE acquires service group access control information (step S820). The service group control information may be provided for each service group to which the access control is applicable. By providing service grouping information together with the service group control information, the UE may determine to which service group a specific service belongs.

Although an example in which the UE first acquires the SSAC information in step S810 and thereafter acquires the service group access control information in step S820 is considered in FIG. 8, the embodiment of the present invention is not limited thereto. The UE may first acquire the service group access control information and thereafter may acquire the SSAC information. In addition, similarly to a case of receiving a specific message including the SSAC information and the service group access control information, the UE may receive two types of information through message signaling to be performed one time. In addition, the service grouping information may not be provided together with the service group access control information, and may be provided to a network through additional message signaling. In this case, there may be no special restriction regarding whether the service grouping information is provided before or after a time of providing the SSAC information and/or the service group access control information.

The UE performs an access control for a specific service (step S830). When performing the access control for the service, at least one of the SSAC information, the service grouping information, and the service group access control information may be used. More specifically, the UE may determine whether a specific service is included in a service group by using the service grouping information, and according to whether the specific service is included therein, may calculate a survival rate on the basis of the barring factor parameter included in the SSAC information and/or the barring factor parameter included in the service group access control information. The UE may determine whether an access for a corresponding service is allowed according to the survival rate.

The survival rate may be calculated by using an RRC layer. That is, the RRC layer may receive the SSAC information, the service grouping information, and the service group access control information, and may determine whether a specific service is included in a service group by using the service grouping information. The RRC layer calculates the survival rate by using the barring factor parameter of the SSAC information and/or the barring factor parameter of the service group access control information according to whether the specific service is included in the service group. The RRC layer forwards the calculated survival rate to an MMTel layer. According to the delivered survival rate, the MMTel layer may determine whether an access is allowed.

Alternatively, the survival rate may be calculated by the MMTel layer. That is, the RRC layer receives the SSAC information, the service grouping information, and the service group access control information, and forwards the barring factor parameter of the SSAC information and the barring factor parameter of the service group access control information to the MMTel layer. The MMTel layer determines whether a specific service is included in a service group by using the service grouping information. According to whether the specific service is included in the service group, the MMTel layer calculates the survival rate by using the barring factor parameter of the SSAC information and/or the barring factor parameter of the service group access control information. According to the calculated survival rate, the MMTel layer may determine whether an access is allowed.

When the survival rate is calculated by using the barring parameter of the SSAC information and/or the barring parameter of the service group access control information, a plurality of parameters may be accumulatively applied or a specific parameter among the plurality of parameters may be selectively applied.

Whether an access for a specific service is allowed according to the survival rate may be performed by comparing a randomly drawn number/value within a uniformly distributed range and the calculated survival rate. If the randomly drawn number/value is less than the survival rate, it may be determined that an access for a corresponding service is allowed. Herein, the randomly drawn number/value may be selected within a range [0, 1), and a barring factor parameter for calculating the survival rate may be a specific value also within the range [0, 1).

If the access for the specific service is allowed, the UE may attempt an RRC connection establishment by starting a process of establishing an RRC connection with the network. The RRC connection establishment process is performed by an RRC layer. The RRC layer may receive a report regarding whether an access is allowed from the MMTel layer, and thus may start the RRC connection establishment process according thereto.

If the access for the specific service is not allowed, the UE may report a failure/inability of an RRC connection establishment to a higher layer (e.g., a NAS layer). In addition, the UE may start a barring timer which is set to a barring time calculated by applying the barring time parameter of the SSAC information and/or the service group access control information. It may be regarded that a network access of the UE is barred during a corresponding timer is running.

Hereinafter, an access control method performed by a UE will be described in greater detail by taking a specific example shown in the accompanying drawings.

Figure 9:
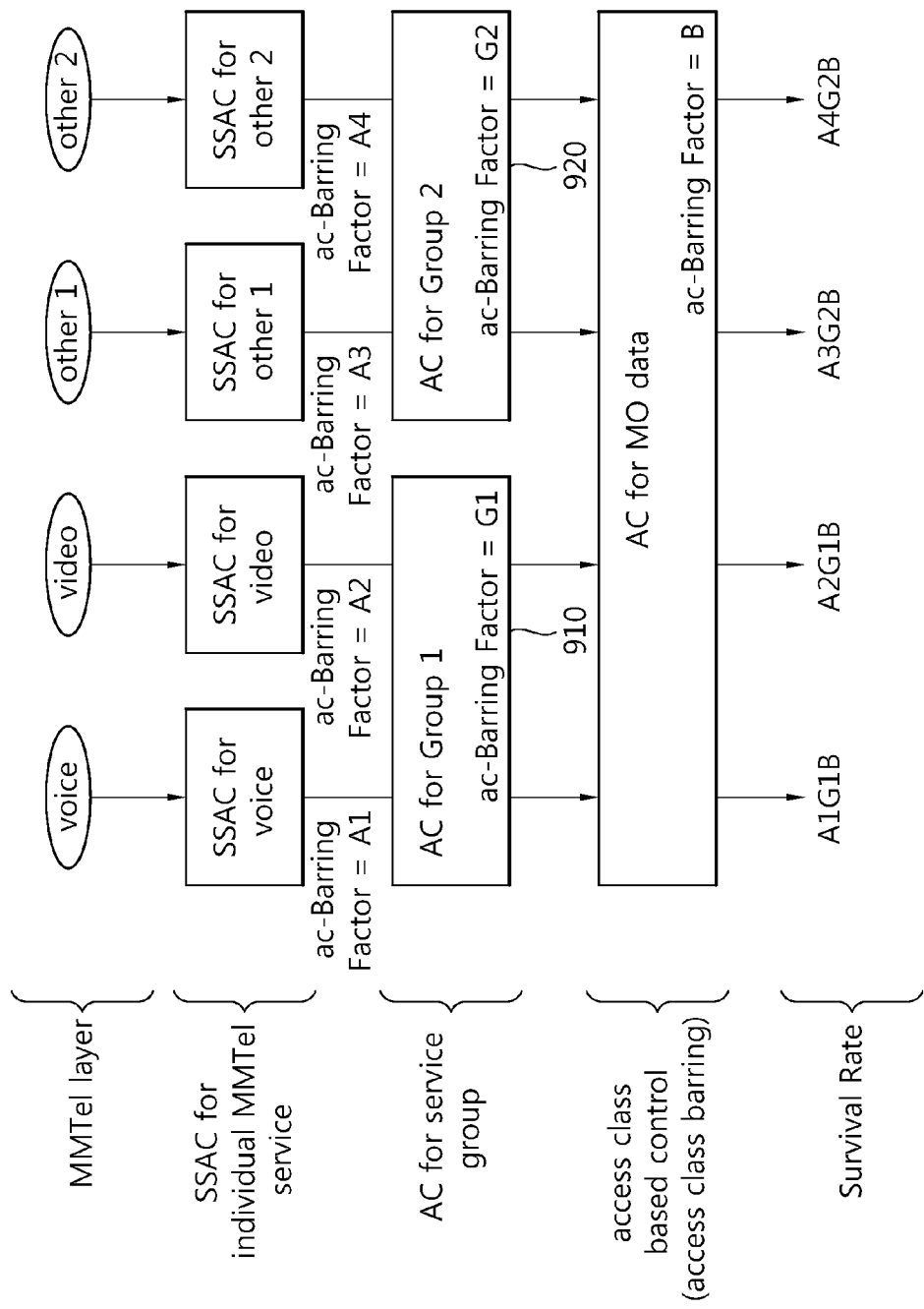
FIG. 9 shows an example of performing an access control method according to an embodiment of the present invention.

FIG. 9 shows an example of performing an access control method according to an embodiment of the present invention.

In the present example, it is assumed that each MMTel service is a target of SSAC. It is assumed that a voice service, a video service, and two extra services (other 1, 2) other than the voice and video services are considered as the MMTel service.

A UE acquires SSAC information for each service. The UE may acquire SSAC information on the voice service, SSAC information on the video service, SSAC information on the first other service, and SSAC information on the second other service. Each SSAC information may include a barring factor parameter and a barring time parameter of a corresponding service.

A voice service barring factor parameter may be denoted by 'A1'. A video service barring factor parameter may be denoted by 'A2'. A first other service barring factor parameter may be denoted by 'A3'. A second other service barring factor parameter may be denoted by 'A4'. Each barring factor parameter may be set to a value greater than or equal to 0 and less than 1.

A voice service barring time parameter may be denoted by 'T1'. A video service barring time parameter may be denoted by 'T2'. A first other service barring time parameter may be denoted by 'T3'. A second other service barring time parameter may be denoted by 'T4'. Each barring time parameter may be set to a specific value.

The UE may acquire serving grouping information. Accordingly, the UE can know that the voice service and the video service are grouped to a first service group, and the first other service and the second other service are grouped into a second service group.

The UE acquires service group access control information for each service group. The UE may acquire access control information for the first service group and access control information for the second service group. Each service group access control information may include a barring factor parameter of a corresponding service group and a barring time parameter of the service group. A first service group barring factor parameter 910 may be denoted by 'G1', and a second service group barring factor parameter 920 may be denoted by 'G2'. Each service group barring factor parameter may be set to a value greater than or equal to 0 and less than 1. A first service group barring time parameter may be denoted by 'GT1', and a second service group barring time parameter may be denoted by 'GT2'. Each service group barring time parameter may be set to a specific value.

The UE may calculate a survival rate for each service by using each SSAC barring factor parameter and service group barring factor parameter. In addition, if barring information based on an access class allocated to the UE is provided, the UE may apply an access class barring factor to calculate the survival rate. It is assumed in the present example that the access class barring factor is 'B'. When a plurality of barring factor parameters are applied, the survival rate may be determined by a multiplication operation of a barring factor parameter.

Since the voice service is included in a first service group, the UE may calculate a survival rate for the voice service by using a voice service barring factor parameter and a first service group barring factor parameter. Accordingly, the survival rate for the voice service may be calculated to A1G1B.

Since the video service is included in the first service group, the UE may calculate a survival rate for the video service by using a video service barring factor parameter and the first service group barring factor parameter. Accordingly, the survival rate for the video service may be calculated to A2G1B.

Since the first other service is included in a second service group, the UE may calculate a survival rate for the first other service by using a first other service barring factor parameter and a second service group barring factor parameter. Accordingly, the survival rate for the first other service may be calculated to A3G2B.

Since the second other service is included in the second service group, the UE may calculate a survival rate for the second other service by using a second other service barring factor parameter and the second service group barring factor parameter. Accordingly, the survival rate for the second other service may be calculated to A3G2B.

The UE may calculate a barring time to be applied when an access for each service is barred by using the SSAC barring time parameter and/or the service group barring time parameter. In addition, when barring information based on an access class allocated to the UE is provided, the UE may apply an access class barring time to calculate the barring time. However, a description on the applying of the access class barring time is omitted in the present example.

Since the voice service is included in the first service group, the UE may calculate a barring time for the voice service by using the voice service barring time parameter and the first service group barring time parameter. Accordingly, the barring time applicable to the voice service may be calculated to T1+TG1.

Since the video service is included in the first service group, the UE may calculate a barring time for the video service by using the video service barring time parameter and the first service group barring time parameter. Accordingly, the barring time applicable to the video service may be calculated to T2+TG1.

Since the first other service is included in the second service group, the UE may calculate a barring time for the first other service by using the first other service barring time parameter and the second service group barring time parameter. Accordingly, the barring time applicable to the first other service may be calculated to T3+TG2.

Since the second other service is included in the second service group, the UE may calculate a barring time for the second other service by using the second other service barring time parameter and the second service group barring time parameter. Accordingly, the barring time applicable to the second other service may be calculated to T4+TG2.

The UE may determine whether an access of a related service is barred on the basis of a survival rate calculated according to the aforementioned method. If an access for a corresponding service is possible, the UE may start a process of establishing an RRC connection to a network. If the access for the corresponding service is impossible, the UE may report an inability of an RRC connection establishment to a higher layer, and may start a barring timer which is set to the calculated barring time.

Although not shown, a survival rate for a service which is not grouped into a service group may be calculated by using a barring factor parameter for the service and a barring factor parameter (if necessary) based on an access class. Meanwhile, equivalently, it may be considered to apply default service group access control information which is access control information applicable to a group of services which are not grouped into a service group. A barring factor parameter of the default service group access control information may be considered as '1'. Likewise, it may be considered that the default service group access control information is also applied when calculating an access barring time. In this case, the barring time parameter may be considered as '0'.

As another example of determining the default service group access control information, the barring factor parameter of the default service group access control information may be considered as '0'. Likewise, it may be considered that the default service group access control information is also applied when calculating an access barring time. In this case, the barring time parameter may be considered as a pre-set specific time. It may also be considered a method of determining whether the network considers the barring factor parameter of the default service group access control information as '0' or '1' with respect to the UE. In this case, the determination may be possible by transmitting an indication included in system information.

Figure 10:
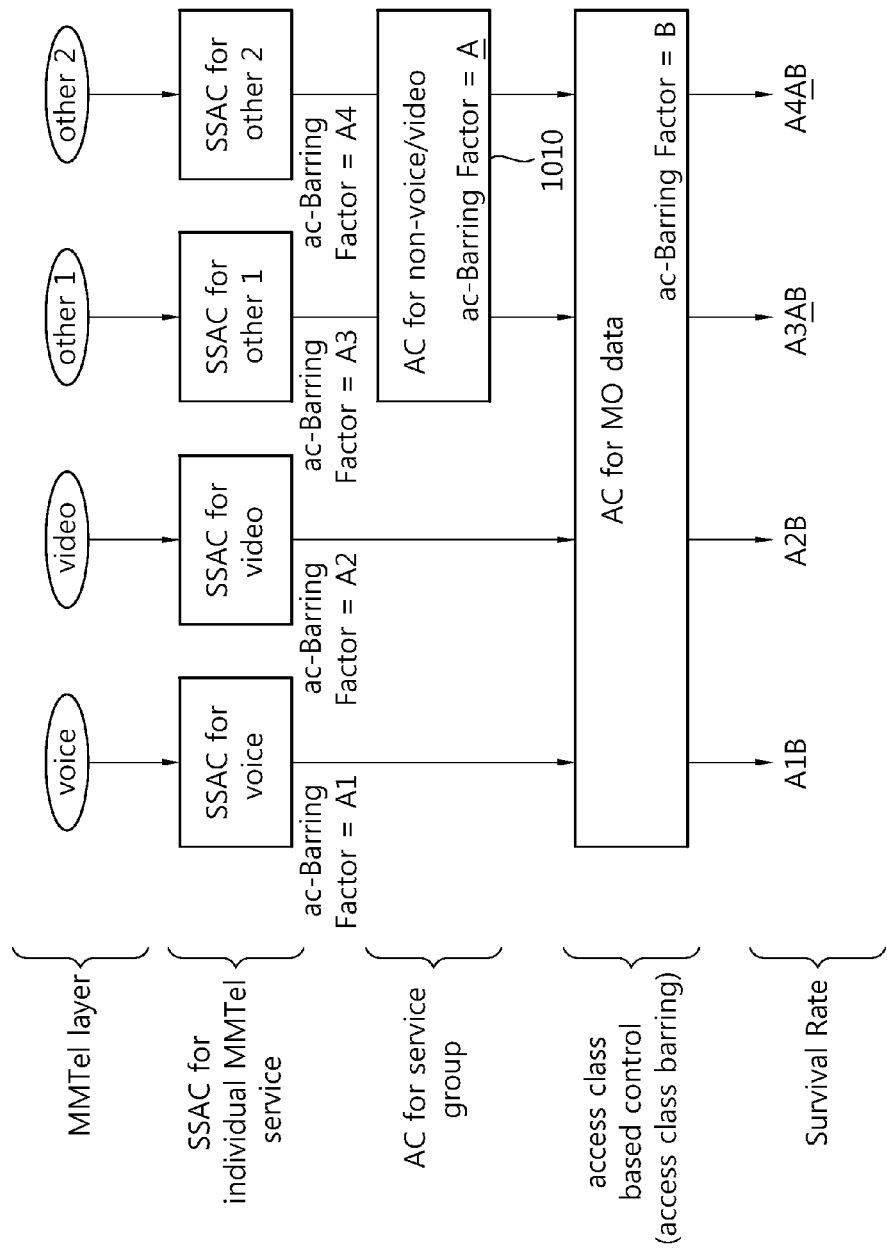
FIG. 10 shows another example of performing an access control method according to an embodiment of the present invention.

FIG. 10 shows another example of performing an access control method according to an embodiment of the present invention.

In the present example, it is assumed that each MMTel service is a target of SSAC. It is assumed that a voice service, a video service, and two extra services (other 1, 2) other than the voice and video services are considered as the MMTel service. In addition, a case where grouping is applied on services other than voice and video services which are conventional services for which SSAC information is provided is assumed in the present example.

A UE acquires SSAC information for each service. The UE may acquire SSAC information on the voice service, SSAC information on the video service, SSAC information on the first other service, and SSAC information on the second other service. Each SSAC information may include a barring factor parameter and a barring time parameter of a corresponding service.

A voice service barring factor parameter may be denoted by 'A1'. A video service barring factor parameter may be denoted by 'A2'. A first other service barring factor parameter may be denoted by 'A3'. A second other service barring factor parameter may be denoted by 'A4'. Each barring factor parameter may be set to a value greater than or equal to 0 and less than 1.

A voice service barring time parameter may be denoted by 'T1'. A video service barring time parameter may be denoted by 'T2'. A first other service barring time parameter may be denoted by 'T3'. A second other service barring time parameter may be denoted by 'T4'. Each barring time parameter may be set to a specific value.

The UE may acquire service grouping information. In doing so, the UE may know that the voice service and the video service are not grouped, and the first other service and the second other service are grouped into a non-voice/video service group.

The UE may acquire access control information on the non-voice/video service. Non-voice/video service group access control information may include a barring factor parameter and a barring time parameter of a service group. A non-voice/video service group barring factor parameter 1010 may be denoted by 'A'. The barring factor parameter may be set to a value greater than or equal to 0 and less than 1. A non-voice/video service group barring time parameter may be denoted by 'T'. The group barring time parameter may be set to a specific value.

The UE may calculate a survival rate for each service by using each SSAC barring factor parameter and/or service group barring factor parameter. In addition, if barring information based on an access class allocated to the UE is provided, the UE may apply an access class barring factor to calculate the survival rate. It is assumed in the present example that the access class barring factor is 'B'. When a plurality of barring factor parameters are applied, the survival rate may be determined by a multiplication operation of a barring factor parameter.

Since the voice service and the video service are not grouped, the UE may calculate a survival rate by using a barring factor parameter for a corresponding service. Accordingly, the survival rate for the voice service may be calculated to A1B, and the survival rate for the video service may be calculated to A2B.

Since the first other service and the second other service are included in the non-voice/video service group, the UE may calculate a survival rate by using a barring factor parameter and service group barring factor parameter for corresponding services. Accordingly, the survival rate for the first other service may be calculated to A3AB, and the survival rate for the second other service may be calculated to A4AB.

The UE may calculate a barring time to be applied when an access for each service is barred by using the SSAC barring time parameter and/or the service group barring time parameter. In addition, when barring information based on an access class allocated to the UE is provided, the UE may apply an access class barring time to calculate the barring time. However, a description on the applying of the access class barring time is omitted in the present example.

Since the voice service and the video services are not grouped, the UE may calculate the barring time by using the barring time parameter for a corresponding service. Accordingly, the barring time for the voice service may be calculated to T1, and the barring time for the video service may be calculated to T2.

Since the first other service and the second other service are included in the non-voice/video service group, the UE may calculate a survival rate by using a barring time parameter and service group barring time parameter for corresponding services. Accordingly, a barring time for the first other service may be determined to T3+T, and a barring time for the second other service may be determined to T4+T.

The UE may determine whether an access of a related service is barred on the basis of a survival rate calculated according to the aforementioned method. If an access for a corresponding service is possible, the UE may start a process of establishing an RRC connection to a network. If the access for the corresponding service is impossible, the UE may report an inability of an RRC connection establishment to a higher layer, and may start a barring timer which is set to the calculated barring time.

In the example of FIG. 10, a survival rate for a service which is not grouped into a specific service group such as voice and video services may be calculated by using a barring factor parameter for the service and a barring factor parameter (if necessary) based on an access class. Meanwhile, equivalently, it may be considered to apply default service group access control information which is access control information applicable to a group of services which are not grouped into a service group. A barring factor parameter of the default service group access control information may be considered as '1'. Likewise, it may be considered that the default service group access control information is also applied when calculating an access barring time. In this case, the barring time parameter may be considered as '0'.

As another example, the barring factor parameter of the default service group access control information may be considered as '0'. The network may be configured to consider which value between '0' and '1' is the barring parameter of the default service group access control information.

In the example of the access control method of FIG. 9 and FIG. 10, when a plurality of barring factor parameters and a plurality of barring time parameters based on SSAC information and service group access control information are allowed for a specific service, the survival rate and the barring time are calculated by accumulatively applying the parameters. Unlike this, the barring factor and barring time parameter of the SSAC information and the barring factor and barring time parameter of the service group access control information may be selectively applied for a specific service.

The selective applying of the SSAC information and the service group access control information may conform to whether a specific service is grouped into a service group. That is, if the specific service is not grouped into the service group, an access control may be performed by applying the SSAC information to a corresponding service. On the other hand, if the specific service is grouped into the service group, the access control may be performed by applying service group access control information to a corresponding service.

If access control information is selectively applied in the example of FIG. 10, an access control is performed by applying SSAC information to each of voice and video services. Therefore, a survival rate for the voice service may be calculated to A1B, and a survival rate for the video service may be calculated to A2B. On the other hand, an access control is performed on the first other service and the second other service by applying service group access control information. Therefore, a survival rate for the first other service and the second other service may be calculated to AB.

Figure 11:
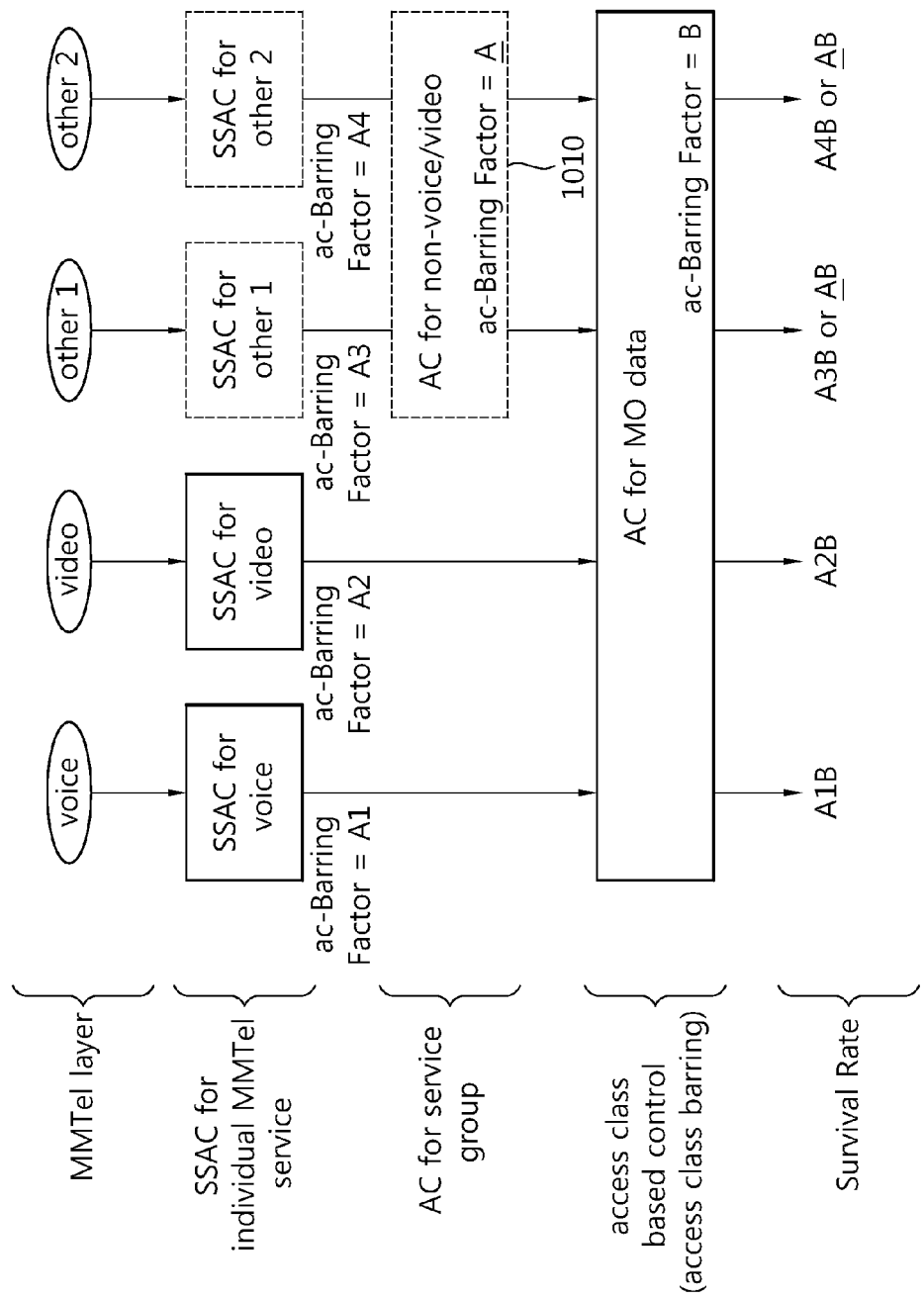
FIG. 11 shows another example of performing an access control method according to an embodiment of the present invention.

FIG. 11 shows another example of performing an access control method according to an embodiment of the present invention.

In the present example, it is assumed that each MMTel service is a target of SSAC. It is assumed that a voice service, a video service, and two extra services (other 1, 2) other than the voice and video services are considered as the MMTel service. In addition, it is assumed in the present example that default service group access control information is not applied when an access of a corresponding service is controlled, if grouping is not achieved to a specific service group and SSAC information for the corresponding service is not provided. The default service group access control information may be provided through system information similarly to SSAC information or may be pre-set in a UE. A default service group barring factor parameter 1110 may be denoted by A, and the default service group barring time parameter may be denoted by T.

The UE acquires SSAC information for each service. The UE may acquire SSAC information on the voice service and SSAC information on the video service. Each SSAC information may include a barring factor parameter and a barring time parameter of a corresponding service.

A voice service barring factor parameter may be denoted by 'A1'. A video service barring factor parameter may be denoted by 'A2'. Each barring factor parameter may be set to a value greater than or equal to 0 and less than 1. A voice service barring time parameter may be denoted by 'T1'. A video service barring factor parameter may be denoted by 'T2'.

Although the voice and video services are not grouped into a specific service group, since SSAC information is provided, default service group access control information is not applied when an access for a corresponding service is controlled. Accordingly, an access control of the voice and video services is performed in the same manner as shown in FIG. 10, and a detailed description thereof will be omitted.

In the first other service and the second other service, a result of an access control may vary according to whether SSAC information for a corresponding service is provided.

First, it is considered a case where SSAC information is provided for other services except for the voice and video services among MMTel services.

The UE may acquire SSAC information on the first other service and the second other service in addition to the voice and video services. Each SSAC information may include a barring factor parameter and a barring time parameter of a corresponding service. A first other service barring factor parameter may be denoted by 'A3'. A second other service barring factor parameter may be denoted by 'A4'. Each barring factor parameter may be set to a value greater than or equal to 0 and less than 1. A first other service barring time parameter may be denoted by 'T3'. A second other service barring time parameter may be denoted by 'T4'. Each barring time parameter may be set to a specific value.

The UE which performs an access control for the first other service and the second other service may determine not to apply default service group access control information since SSAC information of corresponding services is provided. Accordingly, the UE may determine to use each SSAC information when an access control is performed on the first other service and the second other service.

The UE may calculate a survival rate for the first other service and the second other service according to each SSAC barring factor parameter and access class barring factor parameter. Accordingly, the survival rate of the first other service may be calculated to A3B, and the survival rate of the second other service may be calculated to A4B.

The UE may calculate a barring time to be applied when an access for each service is barred according to each SSAC barring time parameter. Accordingly, a barring time for the first other service may be calculated to T3, and a barring time for the second other service may be calculated to T4. When barring information based on an access class allocated to the UE is provided, the UE may apply an access class barring time to calculate a barring time. However, the applying of the access class barring time is omitted in the present example.

Next, it is considered a case where SSAC information regarding other services except for voice and video services among MMTel services is not provided.

The UE fails in acquisition of SSAC information on the first other service and the second other service except for the voice and video services. In addition, it may be confirmed that the first other service and the second other service are not grouped according to service grouping information. Therefore, when performing an access control for the first other service and the second other service, the UE may determine to apply default service group access control information.

The UE may calculate a survival rate for the first other service and the second other service according to an access class barring factor parameter and a default service group barring factor parameter 1110 of default service group access control information. Accordingly, the survival rate of the first other service and the second other service may be calculated to $\underline{A}B$.

The UE may calculate a barring time to be applied when an access for the first other service and the second other service is barred according to the default service group barring time parameter of the default service group access control information. Accordingly, the barring time for the first other service and the barring time for the second other service may be calculated to $\underline{T}$. If barring information based on an access class allocated to the UE is provided, the UE may apply the access class barring time to calculate the barring time. However, the applying of the access class barring time is omitted in the present example.

The UE may determine whether an access of a related service is barred on the basis of a survival rate calculated according to the aforementioned method. If an access for a corresponding service is possible, the UE may start a process of establishing an RRC connection to a network. If the access for the corresponding service is impossible, the UE may report an inability of an RRC connection establishment to a higher layer, and may start a barring timer which is set to the calculated barring time.

In the embodiment of the present invention described above with reference to the drawings, it is exemplified that a barring factor parameter included in SSAC information and service group access control information is set a specific value greater than or equal to 0 and less than 1. However, the barring factor parameter is not limited thereto, and thus may be set to a value greater than or equal to 1. For example, when an SSAC barring factor parameter is a value greater than or equal to 0 and less than 1, if a service group barring factor parameter related to a corresponding service is set to a value greater than or equal to 1, the calculated survival rate may be a value greater than a value of the SSAC barring factor parameter. When the barring factor parameter which is set to the value greater than or equal to 1 is applied as described above, a possibility of allowing an access for a corresponding service is more improved.

Meanwhile, the barring factor which is set to the value greater than or equal to 1 may be implemented as an additional barring factor other than the SSAC barring factor parameter and the service group barring factor parameter. The network may provide access control information including such a barring factor to increase a possibility of allowing an access when an access control is performed on a specific service or a specific service group. The access control information may be transmitted to the UE through broadcasting or dedicated signaling.

Although an operation used to calculate the survival rate by using the barring factor parameters is a multiplication operation in the embodiment of the present invention, the present invention is not limited thereto. Different operations may be applied between the barring factor parameters, and the survival rate may be calculated based thereon. It is also possible to provide a method in which the network indicates an operation used when the UE calculates the survival rate. For example, if a barring factor parameter of a specific service is A and a service group barring factor parameter of a service group to which a corresponding service belongs is G, which method is applied by a UE among AG, A/G, A+G, and A−G in the method of calculating the survival rate may be indicated by the network. Such an operation indication of the network may be related to whether an access related to a specific service is preferably allowed or the access is not allowed. If a '+' operation is applied, the survival rate is increased, and this may mean that the network intends to preferentially allow an access for a corresponding service. On the other hand, if a '−' operation is applied, the survival rate is further decreased, and this may mean that the network does not intend to preferentially allow the access for the corresponding service.

Although an operation used to calculate a barring time by using barring time parameters is an addition operation in the embodiment of the present invention, the present invention is not limited thereto. Different operations may be applied between barring time parameters, and the barring time may be calculated based thereon. The operation method used when the UE calculates the barring time may be indicated by the network. For example, if a barring time parameter of a specific service is T and a service group barring time parameter of a service group to which a corresponding service belongs is $G_T$, which method will be applied by the UE among $T+G_T$, $T-G_T$, $TG_T$, and $T/G_T$ may be indicated by the network. Such an operation indication of the network may be related to whether an access related to a specific service is preferentially allowed or the access is not allowed. When the '+' operation is applied, the barring time becomes longer, which leads to a result in which an access attempt for a barred service is not allocated for a longer time duration. On the other hand, when the '−' operation is allowed, the barring time becomes shorter, which may lead to a result in which an access attempt related to a barred service can be performed again within a shorter time duration. Therefore, a network which intends to allow an access for a corresponding service may perform signaling indicating that the '−' operation will be applied, and a network which does not intend to allow the access may perform signaling indicating that the '+' operation will be applied.

According to an embodiment of the present invention, there is provided an access control method based on serving grouping and serving group access control information in a communication environment capable of providing significantly various services. Since signaling for providing a barring parameter through serving grouping can be minimized, an effective access control is performed. In addition, even if a network does not provide access control information that can be dedicated for a corresponding service among services used by a UE through a default service group, an access control for the corresponding service may be possible.

Figure 12:
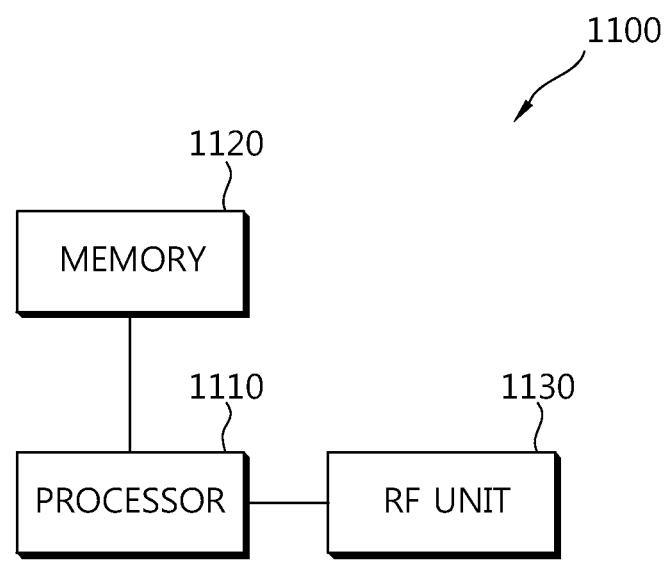
FIG. 12 is a block diagram showing a wireless apparatus according to an embodiment of the present invention.

FIG. 12 is a block diagram showing a wireless apparatus according to an embodiment of the present invention. The apparatus may be implemented by using a UE or network system for performing an access control method according to an embodiment of the present invention.

Referring to FIG. 12, a wireless apparatus 1200 includes a processor 1210, a memory 1220, and a radio frequency (RF) unit 1230. The processor 1210 implements the proposed functions, procedures, and/or methods. The processor 1210 may be configured to receive SSAC information, service grouping information, and service group access control information. The processor 1210 may be configured to confirm a grouping state regarding an individual service on the basis of the service grouping information. The processor 1210 may be configured to perform an access control regarding a service on the basis of the SSAC information and the service group access control information. The processor 1210 may be configured to perform the aforementioned embodiment of the present invention with reference to FIG. 8 to FIG. 11.

The RF unit 1230 is coupled to the processor 1210, and transmits and receives a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for an access control performed by a terminal in a wireless communication system, the method comprising:
   obtaining service specific access control information;
   obtaining service group access control information; and
   performing an access control for a specific type of a service on the basis of the service group access control information and the service specific access control information,
   wherein the service specific access control information includes a service specific barring factor parameter applied to the specific type of the service, and
   wherein the service group access control information includes a service group barring factor parameter applied commonly to a specific service group including at least one type of the service.

2. The method of claim 1, wherein the performing of the access control comprises, if the specific type of the service is included in the specific service group, determining whether an access to the specific service is allowed by applying the service specific barring factor parameter and the service group barring factor parameter.

3. The method of claim 2, wherein the determining of whether the access is allowed comprises:
   calculating a survival rate by using a value of the service specific barring factor parameter and a value of the service group barring factor parameter; and
   if a randomly drawn value within a uniformly distributed range is less than the survival rate, determining that the access to the specific service is allowed.

4. The method of claim 2, wherein the performing of the access control further comprises, if the specific type of the service is not included in the specific service group, determining whether the access to the specific service is not allowed by applying the service specific barring factor parameter without having to apply the service group barring factor parameter.

5. The method of claim 4, wherein the determining of whether the access is allowed comprises:
   calculating a survival rate by using a value of the service specific barring factor parameter; and
   if a randomly drawn value within a uniformly distributed range is less than the survival rate, determining that the access to the specific service is allowed.

6. The method of claim 1, wherein the performing of the access control comprises, if the specific type of the service is included in the specific service group, determining whether an access to a specific service is allowed by applying the service group barring factor parameter without having to apply the service specific barring factor parameter.

7. The method of claim 6, wherein the determining of whether the access is allowed comprises:
   calculating a survival rate by using a value of the service group barring factor parameter; and
   if a randomly drawn value within a uniformly distributed range is less than the survival rate, determining that the access to the specific service is allowed.

8. The method of claim 6, wherein the performing of the access control comprises, if the specific type of service is included in the specific service group, determining whether the access to the specific service is allowed by applying the service specific barring factor parameter without having to apply the service group barring factor parameter.

9. The method of claim 8, wherein the determining of whether the access is allowed comprises:
calculating a survival rate by using a value of the service specific barring factor parameter; and
if a randomly drawn value within a uniformly distributed range is less than the survival rate, determining that the access to the specific service is allowed.

10. The method of claim 1, further comprising receiving service grouping information, wherein the service grouping information indicates a relation between the specific service and the specific service group.

11. The method of claim 1, wherein access class barring information based on an access class allowed to the terminal is additionally applied to an access control for the specific service.

12. A wireless apparatus operating in a wireless communication system, the apparatus comprising:
a radio frequency (RF) unit for transmitting and receiving a radio signal; and
a processor operatively coupled to the RF unit, wherein the processor is configured for:
obtaining service specific access control information;
obtaining service group access control information; and
performing an access control for a specific type of a service on the basis of the service group access control information and the service specific access control information,
wherein the service specific access control information includes a service specific barring factor parameter applied to the specific type of the service, and
wherein the service group access control information includes a service group barring factor parameter applied commonly to a specific service group including at least one type of the service.

13. A method of controlling an access performed by a terminal in a wireless communication system, the method comprising:
obtaining service specific access control information applied to a specific type service;
obtaining default service group access control information; and
performing an access control for the specific type service on the basis of the service specific access control information and the default service group access control information,
wherein the service specific access control information includes a service specific barring factor parameter applied to the specific type service, and
wherein the default service group access control information is information applied to a service group which is not grouped by a network, and the service group includes the specific type service.

14. The method of claim 13, wherein the default service group access control information is pre-set in the terminal.

* * * * *